United States Patent
Narayanamurthi et al.

(10) Patent No.: US 10,430,504 B1
(45) Date of Patent: Oct. 1, 2019

(54) PRESENTING DOCUMENT VERSIONS

(71) Applicant: Amazon Technologies, Inc., Seattle, WA (US)

(72) Inventors: Subha Narayanamurthi, Sunnyvale, CA (US); Preetam J. D'Souza, Mountain View, CA (US); Brendan Donald Lee, San Jose, CA (US); Olivier Suritz, Sunnyvale, CA (US); Kyu Simm, Foster City, CA (US); Cynthia Zhang Taylor, San Leandro, CA (US); Robert Norris Lance Krentler, Palo Alto, CA (US); Kevin George Gillett, Palo Alto, CA (US); Noah Eisner, Menlo Park, CA (US)

(73) Assignee: Amazon Technologies, Inc., Seattle, WA (US)

( * ) Notice: Subject to any disclaimer, the term of this patent is extended or adjusted under 35 U.S.C. 154(b) by 255 days.

(21) Appl. No.: 14/635,424

(22) Filed: Mar. 2, 2015

(51) Int. Cl.
*G06F 17/22* (2006.01)
*G06F 17/24* (2006.01)

(52) U.S. Cl.
CPC .......... *G06F 17/2288* (2013.01); *G06F 17/24* (2013.01)

(58) Field of Classification Search
CPC .............................. G06F 17/212; G06F 17/2288
See application file for complete search history.

(56) References Cited

U.S. PATENT DOCUMENTS

| | | | |
|---|---|---|---|
| 5,893,908 A * | 4/1999 | Cullen et al. | G06F 17/30 |
| 6,910,188 B2 * | 6/2005 | Keohane et al. | G09F 3/00 |
| 8,274,506 B1 * | 9/2012 | Rees | G06T 15/04 345/419 |
| 2007/0061337 A1 * | 3/2007 | Saito et al. | G06F 17/30 |
| 2014/0033068 A1 * | 1/2014 | Gupta | G06Q 10/103 715/751 |
| 2014/0095973 A1 * | 4/2014 | Chu | G06F 17/2288 715/229 |
| 2016/0110314 A1 * | 4/2016 | Carter | G06F 17/212 715/273 |

* cited by examiner

*Primary Examiner* — James J Debrow
(74) *Attorney, Agent, or Firm* — Lee & Hayes, P.C.

(57) ABSTRACT

An example method includes receiving an input via a computing device indicative of a request to display a plurality of visual identifiers, each visual identifier corresponding to a different respective version of a document stored in at least one remote document management system. The method also includes receiving information from the document management system, determining a chronological sequence associated with displaying the plurality of visual identifiers; and generating a respective visual identifier representative of each version of the document. The method also includes displaying the visual identifiers on a display of the computing device according to the chronological sequence.

20 Claims, 5 Drawing Sheets

PRESENTING DOCUMENT VERSIONS

BACKGROUND

Existing computing devices may be used to generate, store, and modify electronic documents in a variety of different environments. For example, users may generate an electronic document and may store the document on a remote server, document management system, or other like repository. As the drafting process progresses, multiple users may collaborate on the electronic document and, as a result, it is common for multiple versions of the document to be created. Such versions may also be stored remotely with the original document. While the creation and storage of multiple document versions may be convenient in some situations, it can be cumbersome for users to manage these versions of the document as time passes. For example, it may be difficult for users to recall the various revisions, comments, and/or changes included in each of the stored document versions.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
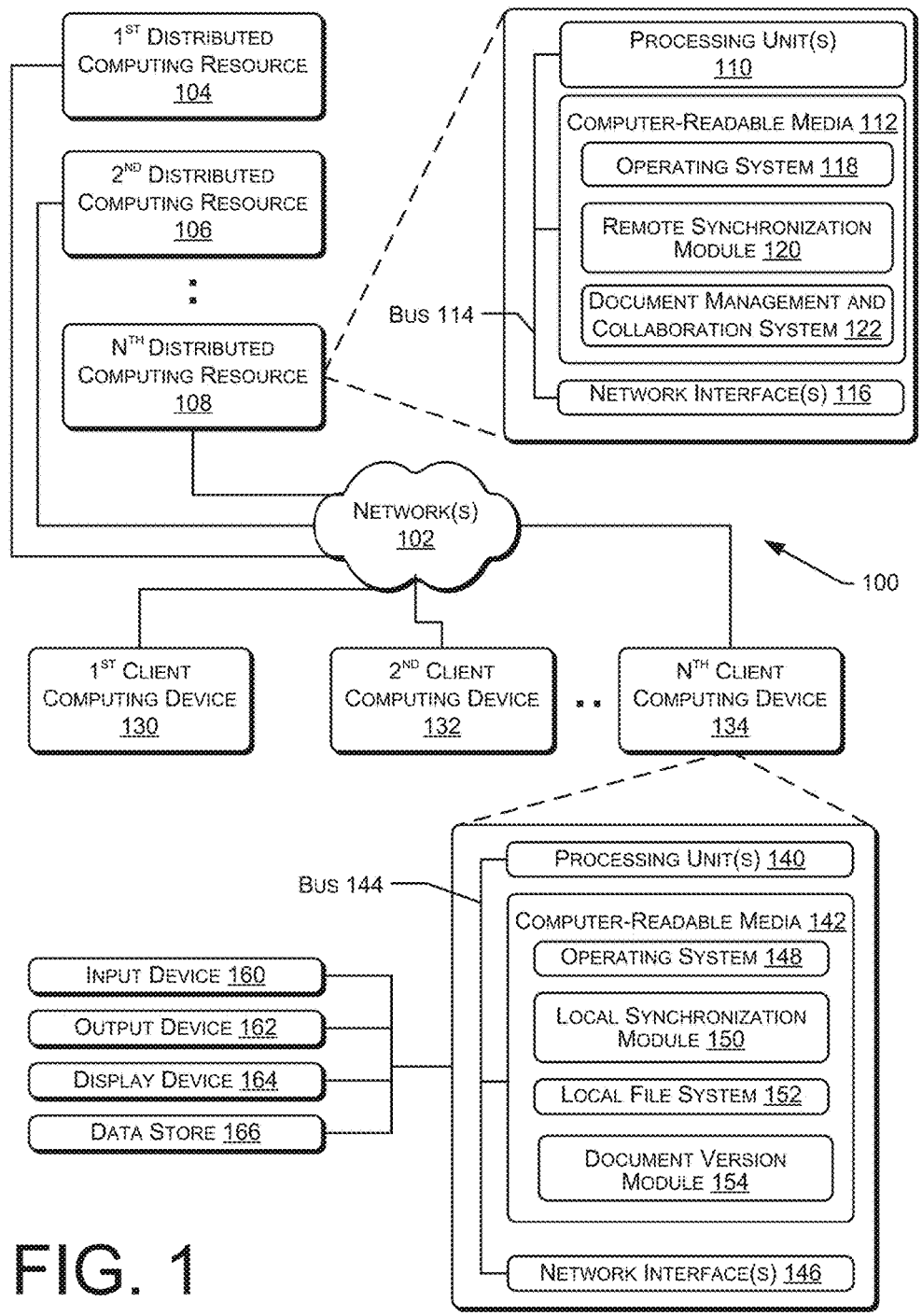
FIG. 1 illustrates an example environment for sharing and/or collaborating on electronic documents using a document management and collaboration system.

Described herein are systems and methods for visualizing edits, comments, and/or other modifications included in multiple versions of a remotely stored electronic document. In example embodiments of the present disclosure, a user of a computing device may access at least one remote document management system in which the multiple versions of the document are stored. For example, the computing device may include a document version module configured to communicate with the at least one remote document management system via a network. In some embodiments, various versions of the document may be stored on more than one remote document management systems accessible via the network. Upon accessing the document management system, the user may, through a user interface provided by the document version module, select a particular document of interest, and may request further information regarding multiple versions of the document stored in the document management system.

In response to such a request by the user, the document version module may obtain metadata and various other information from the document management system, and may process the information in a number of ways. For instance, the received information may include date, time, and other data identifying when each of the versions was last modified. The received information may also include data indicating the substance of such modifications, the author(s) of such modifications, and other data. In an example embodiment, the document version module may determine a time-based or activity-based sequence in which to display visual identifiers associated with the respective document versions based at least in part on such information.

In addition, the document version module may generate a respective visual identifier representative of each version of the document based at least in part on the received information. In some embodiments, the type of visual identifiers generated by the version module may vary depending upon, among other things, a selected, default, or preferred display layout. For example, the document version module may be configured to display visual identifiers on a display of the computing device in a two-dimensional layout in which a plurality of visual identifiers are arranged ether horizontally or vertically along a linear axis. When such an example display layout is employed, the document version module may generate visual identifiers in the form of a plurality of icons. Each icon may correspond to a respective one of the stored versions of the selected document, and such icons may include (e.g., display) at least a portion of the information received from the document management system corresponding to the respective version of the document. For example, an icon may list the title of the document, the author of the respective version, the date and/or time of the most recent edits, etc.

Alternatively, the document version module may be configured to display visual identifiers on the display in a three-dimensional layout in which a plurality of visual identifiers are arranged substantially along a z-axis such that a first identifier overlays at least a portion of a second identifier, and so on. In such an example, the visual identifiers may be in the form of thumbnails, and the top-most (e.g., front-most) thumbnail may be more opaque than the thumbnails beneath it. In such an example, the opacity of the thumbnails may increase as the thumbnails scroll toward the user (e.g., toward the top of the stack of thumbnails along the z-axis) on the display. Additionally, each of the thumbnails may include an image of at least a portion of a corresponding version of the document. In such examples, one or more of the images may illustrate various edits, comments, or other changes made to the respective version.

Since the various examples described herein provide ways for the user to quickly visualize and understand the various edits, comments, revisions, and/or other changes included in multiple remotely stored versions of a document, embodiments of the present disclosure may assist in improving user efficiency and satisfaction. In particular, such methods enable the user to quickly glean, through visual identifiers presented in a time-based or activity-based sequence, various differences between such document versions. Such capabilities may be useful in a number of situations, such as situations in which a large number of versions exist, the various document versions are voluminous, and a large number of collaborators participated in authoring separate document versions.

Referring now to FIG. 1, a detailed example of a file sharing and collaboration system is illustrated and is generally designated 100. As will be discussed in detail with respect to FIGS. 2-5, various components of the system 100 may be used to present document version identifiers on, for example, a computing device. The system 100 of FIG. 1 can include at least one network 102. For example, the network 102 may include public networks such as the Internet, private networks such as an institutional and/or personal intranet, or some combination of private and public networks. The network 102 may also include any type of wired network, wireless network, or a combination thereof. Further, the wireless network may include, for example, a satellite network, a cellular network (e.g., 3G, 4G, etc.), a Wi-Fi network, a WiMax network, another wireless network, or a combination thereof. Moreover, the wired network may include an Ethernet connected via Cat-5 cable, twisted pair telephone lines, coaxial cable, fiber optic cable, or a combination thereof. In another implementation, the network 102 may be a wide area network (WAN), a local area network (LAN), or a combination thereof. Further, the network 102 may include a plain-old telephone service (POTS) network.

The network 102 may utilize communications protocols, including packet-based and/or datagram-based protocols such as internet protocol (IP), transmission control protocol (TCP), user datagram protocol (UDP), or other types of protocols. Moreover, the network 102 may also include a number of devices that facilitate network communications and/or form a hardware basis for the networks, such as switches, routers, gateways, access points, firewalls, base stations, repeaters, backbone devices, and the like.

In some examples, the network 102 may further include one or more devices that enable connection to a wireless network, such as a wireless access point (WAP). Additional examples support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), and other standards.

As further illustrated in FIG. 1, the system 100 can also include a first distributed computing resource 104, a second distributed resource 106, and an Nth distributed resource 108 connected to the network 102. In various examples, the distributed computing resources 104, 106, 108 may include one or more computing devices that operate in a cluster or other grouped configuration to share resources, balance load, increase performance, provide fail-over support or redundancy, or for other purposes. The distributed computing resources 104, 106, 108 may also include computing devices that may belong to a variety of categories or classes of devices such as traditional server-type devices, desktop computer-type devices, mobile-type devices, special purpose-type devices, embedded-type devices, and/or wearable-type devices.

Thus, the distributed computing resources 104, 106, 108 may include a diverse variety of device types and are not limited to a particular type of device. The distributed computing resources 104, 106, 108 may represent, but are not limited to, desktop computers, server computers, web-server computers, personal computers, mobile computers, laptop computers, tablet computers, wearable computers, implanted computing devices, telecommunication devices, automotive computers, network enabled televisions, thin clients, terminals, personal data assistants (PDAs), game consoles, gaming devices, work stations, media players, personal video recorders (PVRs), set-top boxes, cameras, integrated components for inclusion in a computing device, appliances, or any other sort of computing device.

FIG. 1 further illustrates the details regarding the Nth distributed computing resource 108. It can be appreciated that the first distributed computing resource 104 and the second distributed computing resource 106 may be configured in substantially the same manner as the Nth distributed computing resource 108 and can include all or a combination of any of the components described herein in conjunction with the Nth distributed computing resource 108.

As shown, the Nth distributed computing resource 108 may be any computing device and the Nth distributed computing resource 108 can include one or more processing units 110 operably, or electrically, connected to computer-readable media 112, e.g., via a bus 114. The bus 114 may include one or more of a system bus, a data bus, an address bus, a PCI bus, a Mini-PCI bus, and any variety of local, peripheral, and/or independent buses.

The Nth distributed computing resource 108 may also include one or more network interfaces 116 to enable communications between the Nth distributed computing resource 108 and other computing resources or devices via the network 102. The network interface 116 may include one or more network interface controllers (NICs) or other types of transceiver devices to send and receive communications over a network. In a particular aspect, as illustrated in FIG. 1, executable instructions can be stored on the computer-readable media 112 and those instructions may include, for example, an operating system 118, a remote shared folder and file synchronization module 120, and other modules, programs, or applications that are loadable and executable by the one or more processing units 110.

Alternatively or in addition, the functionality described herein may be performed, at least in part, by one or more hardware logic components such as accelerators. For example, and without limitation, illustrative types of hardware logic components that may be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. For example, an accelerator may represent a hybrid device, such as one from ZYLEX or ALTERA that includes a CPU core embedded in an FPGA fabric.

The computer-readable media 112 of the Nth distributed computing resource 108 may also include, or be partitioned with, a document management and collaboration system 122 in which a plurality of folders, sub-folders, files, documents, or a combination thereof may be stored. The document management and collaboration system 122 may, for example, enable users of the system 100 to share documents and collaborate on the documents. Further, the document management and collaboration system 122 may enable users to be synchronized such that texts, commentaries, annotations or highlighting that are provided by a first user may be viewed by a second user. Synchronization between users may be performed real-time or semi-continuously, periodically or may be event-driven or event-triggered, whereby the event may be any type of user command, such as storing a document under collaboration. As described herein, the term "user" may refer to a human or a human-operated computing device that is equipped with communication and computing capability.

The term "document" may be any type of media, such as audio-visual media, text files, or other such files that are capable of being rendered on a computing device. A document may be a computer file that is capable of being produced by or edited or viewed using a productivity program or suite. Accordingly, the document may include editable or non-editable text, images, drawings, web content, and the like. In addition to enabling users to collaborate and share documents, the document management and collaboration system 122 may provide users with file systems, directories, databases, repositories, or other organizational structures to manage the documents. The organizational structures may include directories having nested folders and subfolders, and the organizational structures of the document management and collaboration system 122 may be accessible to users and utilized by the users as a way to access documents and different versions of the documents. For example, in some embodiments various versions of a document may be stored on more than one document management and collaboration system 122, such as systems executing on different computing resources 104, 106, 108 accessible via the network 102. Example organizational structures of the document management and collaboration system 122 will be described in greater detail with respect to FIG. 2.

For simplicity, other components or features that may be typically associated, or included, with a computing device such as the Nth distributed computing resource 108 are omitted from the depiction of the Nth distributed computing resource 108 in FIG. 1. These other components or features may include, but are not limited to, an A/C power supply, a D/C power supply, various connector ports, various cords, various LED indicators, speakers, a housing, a chassis, fans, heat sinks, input devices, output devices, display devices, etc.

FIG. 1 further indicates that the file sharing system 100 can include a first client computing device 130, a second client computing device 132, and an Nth client computing device 134. The client computing devices 130, 132, 134 may belong to a variety of categories or classes of devices, which may be the same as or different from the distributed computing resources 104, 106, 108. These categories or classes of devices may include traditional client-type devices, desktop computer-type devices, mobile-type devices, special purpose-type devices, embedded-type devices, and/or wearable-type devices. Further, the client computing devices 130, 132, 134 may include a diverse variety of device types and are not limited to any particular type of device.

For example, the client computing devices 130, 132, 134 may also include, but are not limited to, computer navigation type client computing devices such as satellite-based navigation systems including global positioning system (GPS) devices and other satellite-based navigation system devices, telecommunication devices such as mobile phones, tablet computers, mobile phone tablet hybrid, personal data assistants (PDAs), laptop computers, other mobile computers, wearable computers, implanted computing devices, desktop computers, personal computers, automotive computers, network-enabled televisions, thin clients, terminals, game consoles, gaming devices, work stations, media players, personal video recorders (PVRs), television set-top boxes, digital video recorders (DVRs), cameras, integrated components for inclusion in a computing device, appliances, or any other sort of computing device configured to receive user input.

Moreover, an entity, such as a user, may be associated with each, or any, of the client computing devices 130, 132, 134. The entity may include a particular user and one or more designees of the user such as an assistant of the user, a supervisor of the user, a spouse of the user, a parent of the user, and/or another entity to whom the user grants permission to access the client computing device 130, 132, 134.

FIG. 1 further illustrates the details regarding the Nth client computing device 134. It can be appreciated that the first client computing device 130 and the second client computing device 132 may be configured in the same manner as the Nth client computing device 134 and may include all or a combination of any of the components described herein in conjunction with the Nth client computing device 134.

As depicted, the Nth client computing device 134 may be any computing device and the Nth client computing device 134 can include one or more processing units 140 operably, or electrically, connected to computer-readable media 142, e.g., via a bus 144. The bus 144 may include one or more of a system bus, a data bus, an address bus, a PCI bus, a Mini-PCI bus, and any variety of local, peripheral, and/or independent buses.

The Nth client computing device 134 may also include one or more network interfaces 146 to enable communications between the Nth client computing device 134 and other computing resources or devices via the network 102. The network interface 146 may include one or more network interface controllers (NICs) or other types of transceiver devices to send and receive communications over a network. In a particular aspect, executable instructions can be stored on the computer-readable media 142 of the Nth client computing device 134 and those instructions, as illustrated in FIG. 1, may include, for example, an operating system 148, a local shared folder and file synchronization module 150, and other modules, programs, or applications that are loadable and executable by the one or more processing units 140.

Alternatively, or in addition, the functionally described herein may be performed, at least in part, by one or more hardware logic components such as accelerators. For example, and without limitation, illustrative types of hardware logic components that may be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. For example, an accelerator may represent a hybrid device, such as one from ZYLEX or ALTERA that includes a CPU course embedded in an FPGA fabric.

The computer-readable media 142 of the Nth client computing device 134 may also include, or be partitioned with, a local file system 152 in which a plurality of folders, sub-folders, files, or a combination thereof may be stored. The plurality of folders, sub-folders, and files can include a plurality of shared folders, shared sub-folders, shared files, shared sub-level files, and shared shortcuts. More particularly, the plurality of shared folders, shared sub-folders, shared files, shared sub-level files, and shared shortcuts can include a plurality of local instances of shared folders, a plurality of local instances of shared sub-folders, and a plurality of local instances of shared files.

The computer-readable media 142 can also include a document version module 154 stored thereon. The document version module 154 may be executable by the processing unit 140 to assist in displaying one or more previews of documents stored in the document management and collaboration system 122, and in obtaining information corresponding to the documents stored therein. For example, the document version module 154 may be configured to receive one or more inputs indicative of a user request to display visual identifiers associated with different versions of each document stored in the document management and collaboration system 122. The document version module 154 may, for example, direct a signal to the document management and collaboration system 122 requesting information corresponding to the different versions of a particular stored document. Additionally, or alternatively, in examples in which the different versions of a particular stored document are stored in more than one document management and collaboration system 122, such as systems 122 present, part of, or executing on more than one of the distributed computing resources 104, 106, 108, the document version module 154 may direct signals to the multiple distributed computing resources 104, 106, 108 requesting such information.

Once the requested information is received, the document version module 154 may process the information in a variety of different ways. For example, the document version module 154 may determine a sequence associated with the different versions of the document based on the information. In some embodiments, such a sequence may comprise a chronological sequence associated with changes made to the different versions of the document. In some examples, such changes may be collaborative changes or other changes made by more than one user. Such collaborative changes may include, among other things, edits, modifications, additions, deletions, or other changes to the document made during document generation or document review between two or more users. Such collaborative changes may be made in real time (e.g., substantially simultaneously) or on a transactional basis. Additionally, such a sequence may be indicative of, for example, the order in which the respective versions were created, the order in which the respective versions were most recently edited or otherwise modified, the order in which the respective versions were last opened or otherwise viewed, the order in which the respective versions were last shared, transferred, or downloaded, and/or other such time-based ordering. For example, in some embodiments the information received from the document management and collaboration system 122 may comprise metadata indicative of one or more of the above factors, and the document version module 154 may determine such a sequence based on such metadata. Additionally, an example "reverse chronological" sequence may order items more recent in time at a first position, and items relatively less recent in time at a second position after or secondary to the first position.

In example embodiments, the document version module 154 may also be configured to generate a respective visual identifier representative of each version of the particular document in question using the information received from the document management and collaboration system 122. In some examples, such visual document version identifiers may comprise a plurality of icons, and each icon may include a portion of the information received from the document management and collaboration system 122 corresponding to a respective version of the particular document. In other examples, such visual document version identifiers may comprise a plurality of thumbnails, and each thumbnail may include an image of at least a portion of a corresponding version of the document. Such visual document version identifiers will be described in greater detail below with respect to FIGS. 3 and 4, and in some embodiments, the document version module 154 may present such visual identifiers for display on the computing device 134 according to the sequence described above.

In some examples, the document version module 154 may facilitate visualizing multiple versions of the same document on a single display and with little effort by the user. Thus, the user may quickly and easily understand the order in which various document versions have been created and/or edited, and may also easily view additional information related to, for example, the substance of the edits, the status of the document version, and the like.

Still referring to FIG. 1, the Nth client computing device 134 can also include an input device 160, an output device 162, a display device 164, or a combination thereof connected thereto. In particular, the input device 160, the output device 162, and the display device 164 can be connected to the bus 144. The input device 160, the output device 162, and the display device 164 may provide a user with the ability to communicate with the Nth client computing device 134. The input device 160 may include a mouse, a keyboard, a microphone, a touch screen, a joystick, a hand held controller, a light pen, a track ball, a scanner, a graphic tablet, magnetic ink card reader (MICR), an optical character reader (OCR), a bar code reader, an optical mark reader, or a combination thereof. The output device 162 may include a printer, a speaker, a haptic device, or a combination thereof. The display device 164 may include a screen, a monitor, a projector, or a combination thereof. In example embodiments, the display device 164 may comprise a touch-sensitive display. Such displays may include, for example, one or more light sensors, capacitance sensors, or other sensors configured to detect touch input on a surface of the display device 164.

FIG. 1 further indicates that the file sharing system 100 can include a data store 166 connected to the Nth client computing device 134. It can be appreciated that in an alternative aspect, the shared folder and file local synchronization module 150, the local file system 152, the document version module 154, or a combination thereof may be located within the data store 166. In various aspects and examples, the data store 166 includes data storage such as a database, data warehouse, or other type of structured or unstructured data storage. In some examples, the data store 166 can include a corpus and/or a relational database with one or more tables, indices, stored procedures, and so forth to enable data access including one or more of hypertext markup language (HTML) tables, resource description framework (RDF) tables, web ontology language (OWL) tables, and/or extensible markup language (XML) tables, for example.

The computer-readable media 142 may comprise any memory, computer storage media, and/or communication media. Computer storage media may include volatile memory, nonvolatile memory, and/or other persistent and/or auxiliary computer storage media, removable and non-removable computer storage media implemented in any method or technology for storage of information such as computer-readable instructions, data structures, program modules, or other data. Computer-readable media 112, 142 may be examples of computer storage media similar to data store 166.

Thus, the computer-readable media 112, 142 and/or data store 166 includes tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), mask read-only memory (MROM), programmable read-only memory (PROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that may be used to store and maintain information for access by a computing device.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

For simplicity, other components or features that may be typically associated, or included, with a computing device such as the Nth client computing device 134 are omitted from the depiction of the Nth client computing device 134 in FIG. 1. These other components or features may include, but are not limited to, an A/C power supply, a D/C power supply, various connector ports, various cords, various LED indicators, a housing, a chassis, fans, heat sinks, etc.

The computer-readable storage media 112, 142 and/or data store 166 may be used to store any number of functional components that are executable by the one or more processing units 110, 140. In many implementations, these functional components comprise instructions or programs that are executable by the one or more processing units 110, 140 and that, when executed, implement operational logic for performing the operations attributed to the file sharing system 100. Functional components of the file sharing system 100 that may be executed on the one or more processing units 110, 140 for implementing the various functions and features related to sharing various files and facilitating local collaboration between two or more client computing devices 130, 132, 134, as described herein, include the remote shared folder and file synchronization module 120 within the Nth distributed computing resource 108, the local shared folder and file synchronization module 150 within the Nth client computing device 134, and the document version module 154 on each of the client computing devices 130, 132, 134.

In an implementation, the various modules 120, 150, 154 may include computer-readable instructions that are executable by the processing units 110, 140 to perform operations related to the sharing, collaboration on, and/or synchronization of shared folders and files among several client computing devices 130, 132, 134 and at least one distributed computing resource 104, 106, 108.

Figure 2:
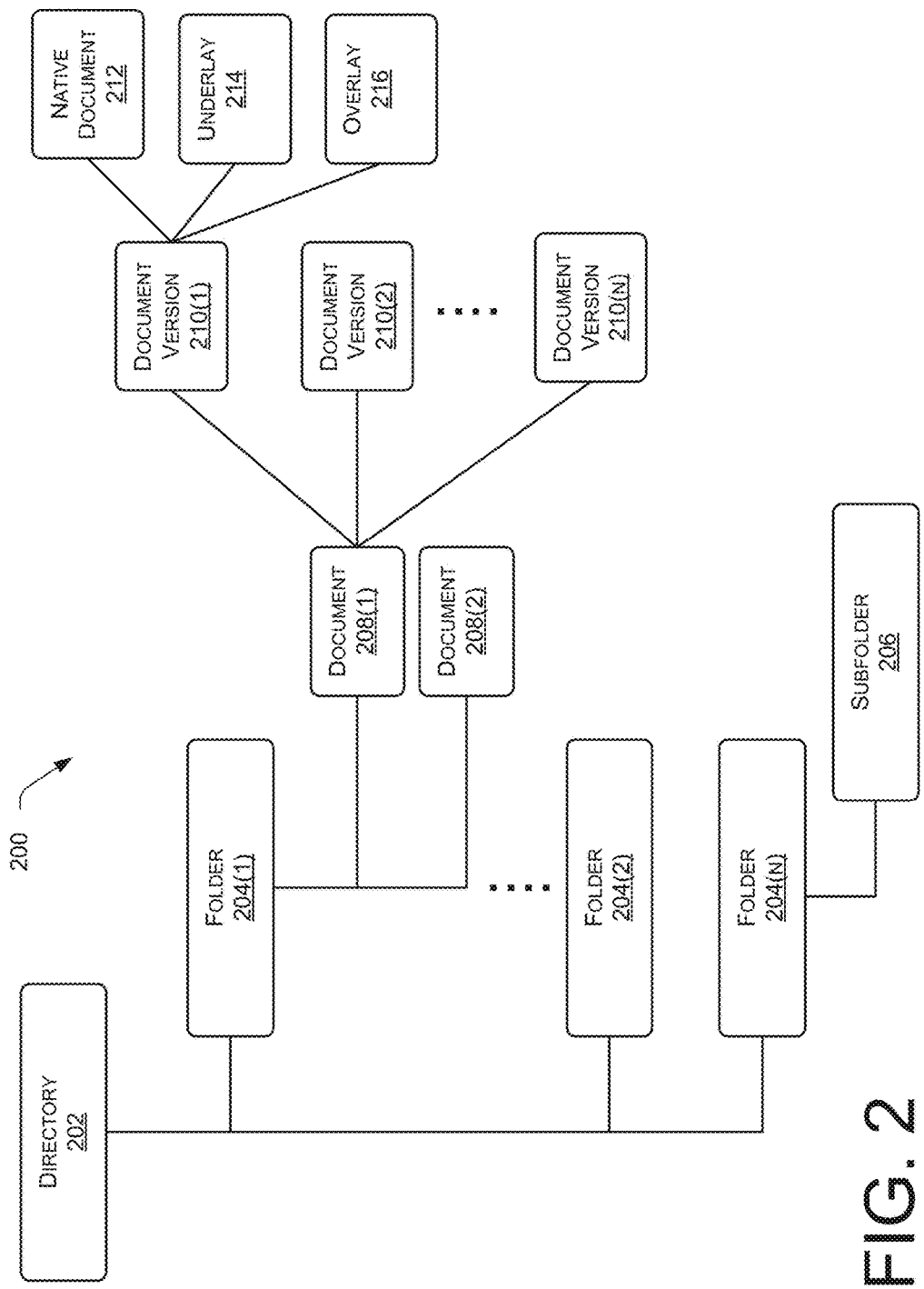
FIG. 2 illustrates an example directory structure associated with the document management and collaboration system shown in FIG. 1.

Referring now to FIG. 2, an example environment 200 associated with the document management and collaboration system 122 is shown. In example embodiments, such an environment may include one or more directories 202, and an example directory 202 may include one or more folders 204(1)-204(N) (singularly referred to herein as "folder 204"). Further, a folder 204 may include one or more subfolders 206 that are nested within the folder 204. As may be recognized, a subfolder 206 may further include one or more nested subfolders. A folder 204 may be a file structure within the directory 202 and, in some embodiments, a security or permission privilege associated with the folder 204 may apply to contents stored within the folder 204, and/or to contents stored within subfolders 206 that are nested within the particular folder 204.

A folder 204 may retain one or more documents 208(1), 208(2) (singularly referred to herein as "document 208"). As shown in FIG. 2, a document 208 may include a plurality of document versions 210(1)-210(N) (singularly referred to herein as "version 210"). A document version 210 may be a revision of a document 208 or a subsequent version or revision of an existing document 208 including, for example, user modifications and changes. Further, the permission or security privileges provided with respect to a document 208 may apply to the plurality of document versions 210 associated with and/or corresponding to the document 208. Each document version 210 may have a plurality of representations including a native document 212, an underlay 214 and an overlay 216. The native document 212 may be an originally uploaded document (for example, in a file format compatible with a productivity suite). An underlay 214 may be a portable representation of the native document 212 that may be rendered on a user device utilizing a web application or a document management and collaboration application. The techniques described herein may apply to any portable representation that may utilize a common format that is independent of application software, hardware, or operating system, and may encapsulate a complete description of a fixed layout of the document. In addition, an overlay 216 may be a representation of annotations made by users and collaborators. For example, an overlay 216 may include a representation of highlights or text commentary.

In example embodiments, more than one document version 210 may include the originally uploaded document 208 as the native document 212. Although a document 208 may include a plurality of versions 210, and each version 210 may include a plurality of representations, as used in various contexts herein, a document 208 may be any one of the versions 210 or any one of the representations. For example, as used herein a user uploaded document 208 may be the native document and an annotation document may be the overlay. Further, in example embodiments the environment 200 of the document management and collaboration system 122 shown in FIG. 2 may be rendered in various styles or formats on a user device utilizing a web application or a document management and collaboration application.

Figure 3:
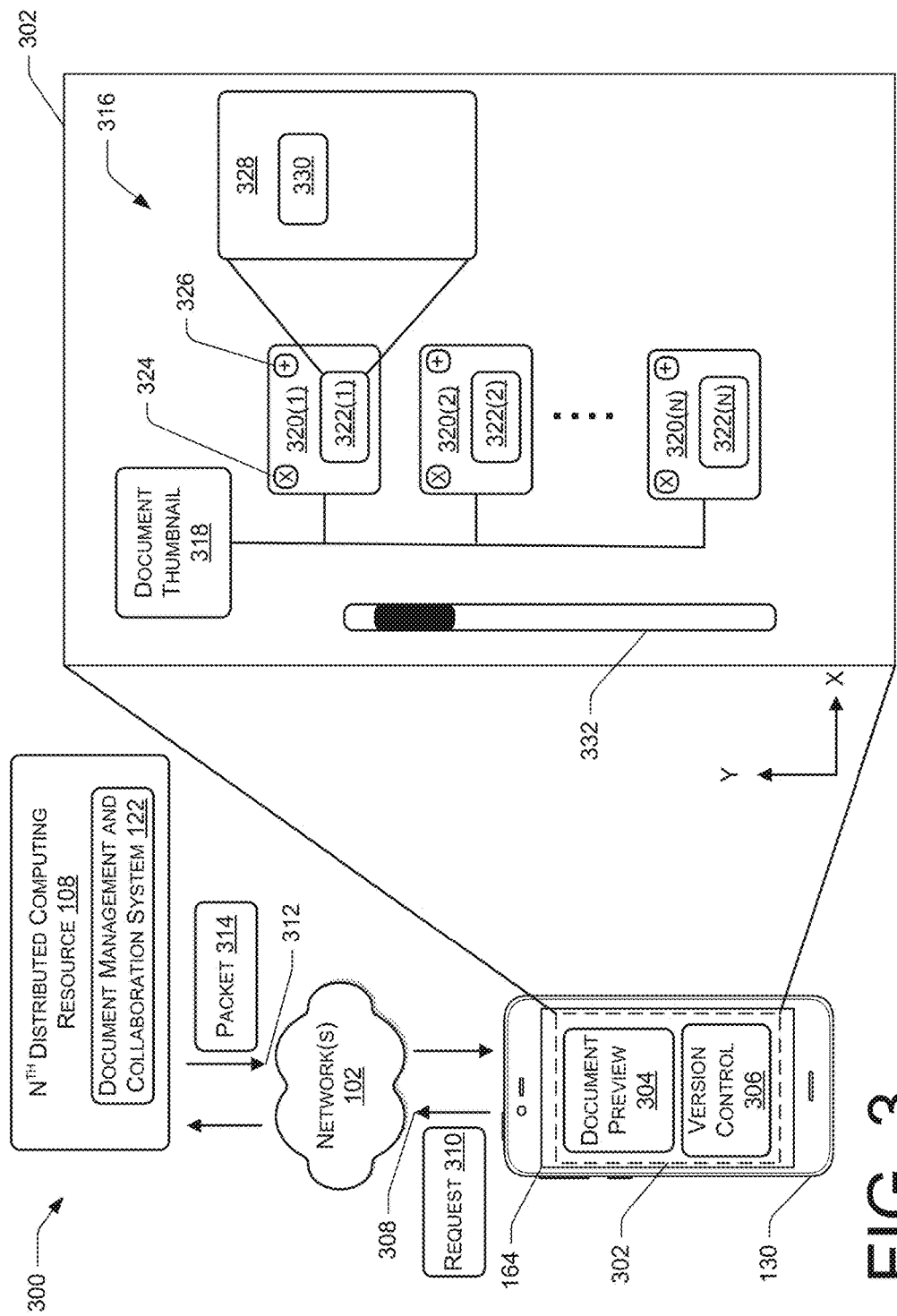
FIG. 3 illustrates an example environment for presenting document version identifiers on a computing device.

FIG. 3 illustrates an example environment 300 of the present disclosure in which, for example, the document version module 154 of the first client computing device 130 has accessed the document management and collaboration system 122 via the network 102. In such examples, the document version module 154 may have activated an application on the first client computing device 130 configured to assist with and/or facilitate displaying visual identifiers associated with different versions of a document stored in the document management and collaboration system 122. Such an application may provide a user of the first client computing device 130 with access to versions of one or more electronic documents stored in the computer readable media 142 and/or other memory of the first computing device 130. For example, activation of such an application may cause the document version module 154 to provide and/or otherwise present a user interface 302 via the display device 164. Such a user interface 302 may include, for example, a visual representation of at least one electronic document stored in the document management and collaboration system 122. In some embodiments, as shown in FIG. 3, the visual representation may comprise a preview 304 of the particular electronic document displayed on the user interface 302. In other embodiments, the visual representation may comprise the actual document, and in such embodiments, the document may be downloaded to the computing device 130 for display.

In example embodiments, the electronic document may be a particular electronic document selected, by a user of the computing device 130, from a plurality of electronic documents stored in the computer-readable media 142. For example, in some embodiments the user interface 302 may present one or more folders, file trees, databases, directories, and/or other file organization structures from which a user of the first client computing device 130 may select the electronic document. For example, in some embodiments at least a portion of the environment 200, such as a portion of the directory 202 and its contents, may be displayed by the user interface 302. In such examples, the visual representation of the electronic document described above with respect to FIG. 3 may be displayed via the display device 164 in response to selection of the particular document as the portion of the directory 202, and its contents, is displayed.

The user interface 302 may also include one or more controls configured to receive input from the user and to direct such input to, for example, the document version module 154 and/or the processing unit 140. For example, one of the controls may comprise a version control 306 configured to receive an input from the user indicative of a request to display one or more visual identifiers associated with the various different versions of a particular electronic document stored in the document management and collaboration system 122.

Receiving such an input via, for example, the version control 306 may cause the document version module 154 to perform a variety of operations. For example, in response to receiving an input from a user via the version control 306, the document version module 154 may generate one or more signals 308 including a request 310 for information corresponding to the different versions of the selected document. As shown in FIG. 3 the computing device 130, and in particular the document version module 154, may direct such a signal 308 to the document management and collaboration system 122 via the network 102. Additionally, the document management and collaboration system 122 may be configured to generate a signal 312 in response to receiving such a request 310. In particular, the document management and collaboration system 122 may generate one or more packets 314 containing files, tags, metadata, scripts, images, and/or other information, and may transmit such packets 314 to the document version module 154, over the network 102, via a response signal 312. FIG. 3 illustrates an example packet 314 for discussion purposes. In example embodiments the packet 314 may include information corresponding to each of the respective versions of the selected document. Alternatively, in other embodiments, the document management and collaboration system 122 may generate one or more separate packets 314, each containing information corresponding to a respective one of the document versions.

In example embodiments, the information included in the various packets 314 generated by the document management and collaboration system 122 may comprise any information useful in determining a time-based sequence associated with the different versions of the selected document, generating a respective visual identifier representative of each version of the selected document, and/or displaying one or more such visual identifiers on the display device 164. For example, such information may include, among other things, a share history (e.g., a listing of individuals and/or entities with whom the selected document, or a version thereof, has previously been shared, as well as date and time information associated with previous sharing events), an edit history (e.g., a listing of individuals who previously edited the document, or a version thereof, and/or who previously generated one or more versions of the document, as well as date and time information associated with such previous activity), a view history (e.g., a listing of individuals and/or entities who previously accessed, opened, and/or otherwise consumed the document, or a version thereof, as well as date and time information associated with such consumption), and/or a download history (e.g., a listing of individuals and/or entities that previously downloaded the document, or a version thereof, as well as date and time information associated with such downloads).

Such information may also include one or more status tags indicative of a current state of the document or version thereof. For example, such status tags may indicate whether the document, or version thereof, is complete or incomplete. Such status tags may also indicate whether the document, or a version thereof, contains one or more errors and/or inaccuracies. Such information may also include metadata associated with identifying the particular document or a respective version thereof. For example, such information may also include a title of the document, the name of an author of the document, and/or date and time information associated with the creation of the document or version thereof. Such information may further include the date and time at which an edit is made to one of the versions, the name of the author of such an edit, and identification of the characters added to or deleted from the version through such an edit, or other information. Such information may be useful in, for example, presenting a user of the computing device 130 with an accurate taxonomy of the document and its respective versions.

As shown in FIG. 3, an example taxonomy 316 may include a plurality of visual document version identifiers, and each identifier of the taxonomy 316 may be associated with a respective version of a selected document. For example, once the user has selected a particular document as described above with respect to the user interface 302, an application executed by the document version module 154 may present a thumbnail 318 corresponding to and/or otherwise indicative of the selected document. In example embodiments, the thumbnail 318 may comprise an icon or other like image providing the user with various information associated with the selected document. For example, the thumbnail 318 may comprise title, author, creation date, creation time, and/or other information associated with the selected document, and may be useful in identifying the document to the user in the context of the taxonomy 316 displayed on the user interface 302.

Additionally, the taxonomy 316 may include a plurality of visual identifiers 320(1)-320(N) (collectively, "visual identifiers 320"), and as noted above, the document version module 154 may generate a respective visual identifier 320 representative of each version of the selected document. In example embodiments, the document version module 154 may utilize the information received from the document management and collaboration system 122 in generating the visual identifiers 320. For example, each of the visual identifiers 320 illustrated in FIG. 3 may comprise an icon associated with a respective version of the selected document. In such an embodiment, each visual identifier 320 may illustrate, display, and/or otherwise include at least a portion 322(1)-322(N) of the information received from the document management and collaboration system 122 corresponding to a respective version of the selected document. For example, each visual identifier 320 shown in FIG. 3 may comprise an icon displaying the title of the selected document, the date and/or time of the most recent edit made to the corresponding version of the document, the author of the most recent edit, and the like. Additionally or alternatively, the visual identifiers 320 may include any of the other information received from the document management and collaboration system 122.

In still further embodiments, one or more of the visual identifiers 320 may be configured to receive one or more inputs from the user of the client computing device 130, and may perform various operations in response to receiving such input. For example, the visual identifiers 320 may include one or more controls configured to receive an input from the user via the display device 164. In an example embodiment, at least one of the visual identifiers 320 may include a roll-back control 324 operable to delete, cancel, or otherwise remove a version of the selected document stored in the document management and collaboration system 122 corresponding to the respective visual identifier 320. Additionally or alternatively, at least one of the visual identifiers 320 may include an audit control 326 operable to display additional information regarding the corresponding version of the document in response to receiving user input. For example, the document version module 154 may cause one or more windows 328 to be displayed via the display device 164 and in association with a corresponding one of the visual identifiers 320 in response to receiving an input via the audit control 326 of the visual identifier 320. Such a window 328 may display, present, and/or otherwise include, for example, an additional portion 330 of the information received from the document management and collaboration system 122. In example embodiments, the additional portion 330 of information included in the window 328 may serve to supplement the portion 322(1) of information already provided via the respective visual identifier 320(1). In some examples, the additional portion 330 of information may include, among other things, at least one of the share history, edit history, review history, or download history of the version of the document corresponding to the respective visual identifier 320 on which the audit control 326 was selected. In still further embodiments, one or more of the visual identifiers 320 may include at least one additional control, and such an additional control may be configured to present and/or otherwise display the version of the selected document corresponding to the respective visual identifier 320 via the display device 164 in response to receiving an input from the user.

Additionally, the taxonomy 316 illustrated in FIG. 3 is configured such that the plurality of visual identifiers 320(1)-320(N) is arranged in accordance with a particular sequence determined by the document version module 154. For example, upon receiving the various information from the document management and collaboration system 122, the document version module 154 may determine a sequence associated with the edits made to the various versions of the selected document. In some embodiments, the document version module 154 may determine a chronological sequence associated with the different versions of the document based on such received information. In such examples, the document version module 154 may determine that a first version of the selected document includes edits that are more recent in time than edits contained in a second version of the document. In such situations, the document version module 154 may arrange the visual identifiers 320 such that a first visual identifier 320(1) corresponding to the first version may be disposed closer to the top of the linear taxonomy 316 than a second visual identifier 320(2) corresponding to the second version. For example, the taxonomy 316 of FIG. 3 may comprise a substantially two-dimensional and/or a substantially linear taxonomy or display layout. In such a taxonomy 316, the visual identifiers 320 may be arranged in a substantially linear fashion, and may be disposed substantially along either a vertical y-axis or a horizontal x-axis in accordance with the chronological sequence determined by the document version module 154.

Is understood that in further example embodiments, any other time-based or use-based sequence may be utilized to display the visual identifiers 320 described herein. For example, in some embodiments a chronological sequence in which visual identifiers 320 associated with versions including edits that are earlier in time may be disposed closer to the top of the y-axis. Further, the user interface 302 may include any additional tools or controls configured to assist the user in navigating the various visual identifiers illustrated thereon. For example, the document version module 154 may cause the user interface 302 to include a scrollbar 332, pan controls, backward and forward controls, or other like tools configured to assist the user in navigating through various screens and/or portions of the taxonomy 316.

Figure 4:
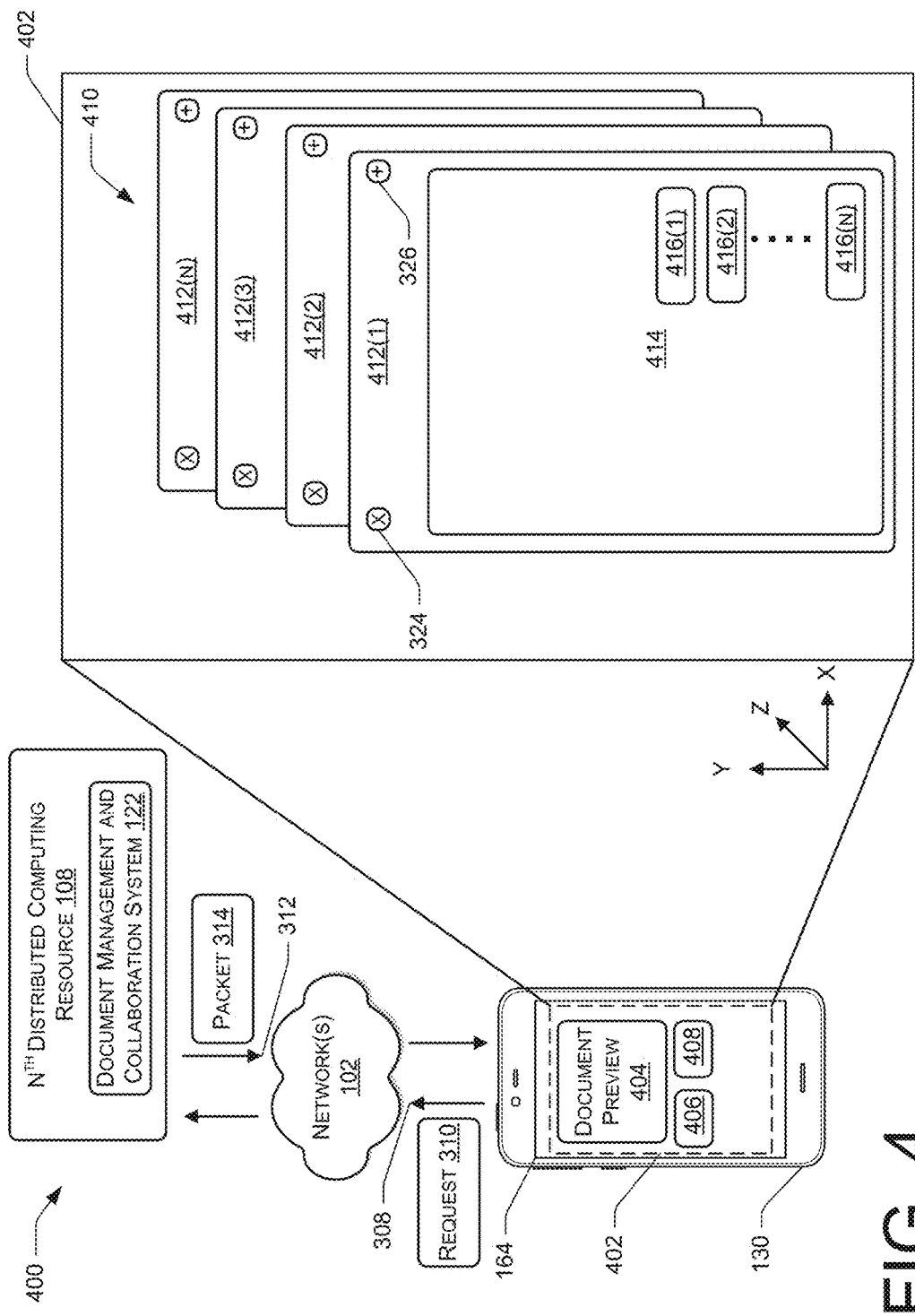
FIG. 4 illustrates another example environment for presenting document version identifiers on a computing device.

FIG. 4 illustrates a further example environment 400 of the present disclosure. In the example environment 400, the document version module 154 may execute an application causing a user interface 402 to be displayed on the display device 164 of the computing device 130. In such an example embodiment, the application may be configured to assist with and/or facilitate displaying visual identifiers associated with different versions of a document stored in the document management and collaboration system 122. As described above with respect to FIG. 3, in some examples, such an application may provide a user of the client computing device 130 with access to versions of one or more electronic documents stored in the computer readable media 142 and/or other memory of the first computing device 130. For example, activation of such an application may cause the document version module 154 to provide and/or otherwise present the user interface 402. The user interface 402 may include, for example, a visual representation of at least one electronic document stored in the document management and collaboration system 122. In some embodiments, as shown in FIG. 4, the visual representation may comprise a preview 404 of the particular electronic document. In other embodiments, the visual representation may comprise the actual document, and in such embodiments, the document may be downloaded to the computing device 130 for display.

The user interface 402 may also include one or more controls configured to receive input from the user and to direct such input to, for example, the document version module 154 and/or the processing unit 140. For example, one of the controls may comprise a version control 406 configured to receive an input from the user indicative of a request to display one or more visual identifiers associated with the various different versions of a particular electronic document stored in the document management and collaboration system 122. The version control 406 may have substantially the same configuration as the version control 306 described above with respect to FIG. 3.

In addition, the user interface 402 may provide the user with one or more options related to the format, and/or layout of the taxonomy to be displayed on the display device 164. For example, the user interface 402 may include at least one layout control 408 configured to receive an input from the user indicative of a selection of a taxonomy and/or display layout. As noted above with respect to FIG. 3, in an example embodiment an optional display layout may include a first layout in which visual identifiers 320 are arranged along an x-axis or a y-axis. Another optional display layout may include a second layout, as illustrated by the example taxonomy 410 of FIG. 4, in which a plurality of visual identifiers 412(1)-412(N) (collectively, "visual identifiers 412") are arranged and/or displayed such that a first visual identifier 412(1) overlays at least a portion of a second visual identifier 412(2) different from the first visual identifier 412(1) and has a greater opacity than the second visual identifier 412(2). In example embodiments, for example, the layout control 408 may provide the user with the option of selecting between the substantially linear, substantially two-dimensional taxonomy 316 described above with respect to FIG. 3 and the substantially three-dimensional taxonomy 410 shown in FIG. 4. In some embodiments, the layout control 408 may include, for example, separate buttons, regions, or other input areas associated with the respective taxonomies 316, 410 to facilitate selection by the user.

In example embodiments, the document version module 154 may utilize the information received from the document management and collaboration system 122 in generating the visual identifiers 412(1)-412(N) (collectively, "visual identifiers 412") shown in FIG. 4. For example, each of the visual identifiers 412 may comprise a thumbnail associated with a respective version of the selected document. In such an embodiment, each visual identifier 412 may include an image 414 of at least a portion of a corresponding version of the selected electronic document. Such an image 414 may be included in the information received from the document management and collaboration system 122 and/or may be generated by the document version module 154 based at least in part on such information. In some examples, an image 414 associated with one or more respective visual identifier 412 may illustrate and/or otherwise include indicia 416(1)-416(N) (collectively, "indicia 416") of revisions made to the version of the document corresponding to the respective image 414. In such examples, the indicia 416 may include edits, mark-ups, corrections, additions, deletions, comments, or other changes to the version. Since such indicia 416 may be easily visible to a user of the computing device 130, example embodiments of the present disclosure may improve the user's ability to view a relatively high volume of document revisions efficiently. For example, the user may scroll through the various visual identifiers 412 of FIG. 4 along the z-axis by, for example, using one or more swipe gestures, using a user interface element (e.g., a scroll bar, a scrubber element, a button), physically moving the computing device, using a keyboard, using a mouse, or by providing other inputs in association with the display device 164.

Additionally, one or more of the visual identifiers 412 may be configured to receive one or more inputs from the user of the computing device 130, and may perform various operations in response to receiving such input. For example, the visual identifiers 412 may include one or more controls configured to receive an input from the user via the display device 164. In an example embodiment, at least one of the visual identifiers 412 may include a roll-back control 324 and/or an audit control 326, and such controls may be substantially the same as the like controls described above with respect to FIG. 3. In still further embodiments, one or more of the visual identifiers 412 may include at least one additional control, and such an additional control may be configured to present and/or otherwise display the version of the selected document corresponding to the respective visual identifier 412 via the display device 164 in response to receiving an input from the user.

Additionally, the taxonomy 410 illustrated in FIG. 4 is configured such that the plurality of visual identifiers 412 is arranged in accordance with a particular sequence determined by the document version module 154. For example, upon receiving the various information from the document management and collaboration system 122, the document version module 154 may determine a sequence associated with the edits made to the various versions of the selected document. In some embodiments, the document version module 154 may determine a chronological sequence associated with the different versions of the document based on such received information. In such examples, the document version module 154 may determine that a first version of the selected document includes edits that are more recent in time than edits contained in a second version of the document. In such situations, the document version module 154 may arrange the visual identifiers 412 such that a first visual identifier 412(1) corresponding to the first version may be disposed closer to the front of the taxonomy 410 (e.g., closer to the display surface of the display device 164 and/or closer to the front and/or top of the stack of visual identifiers 412) than a second visual identifier 412(2) corresponding to the second version. Such an example embodiment may comprise a "reverse chronological" sequence.

As noted above the taxonomy 410 of FIG. 4 may be substantially three-dimensional, and the visual identifiers 412 may be arranged and/or disposed substantially along a z-axis that is orthogonal to the x and y axes. Additionally, the visual identifiers 412 may be arranged and/or displayed such that a first visual identifier 412(1) overlays at least a portion of a second visual identifier 412(2) different from the first visual identifier 412(1) and has a greater opacity than the second visual identifier 412(2). Accordingly, visual identifiers 412 corresponding to versions having more recent edits will be displayed with lower transparency (i.e., higher opacity) than visual identifiers corresponding to versions having edits that are less recent. Is understood that in further example embodiments, any other time-based or use-based sequence may be utilized to display the visual identifiers 412 described herein.

Figure 5:
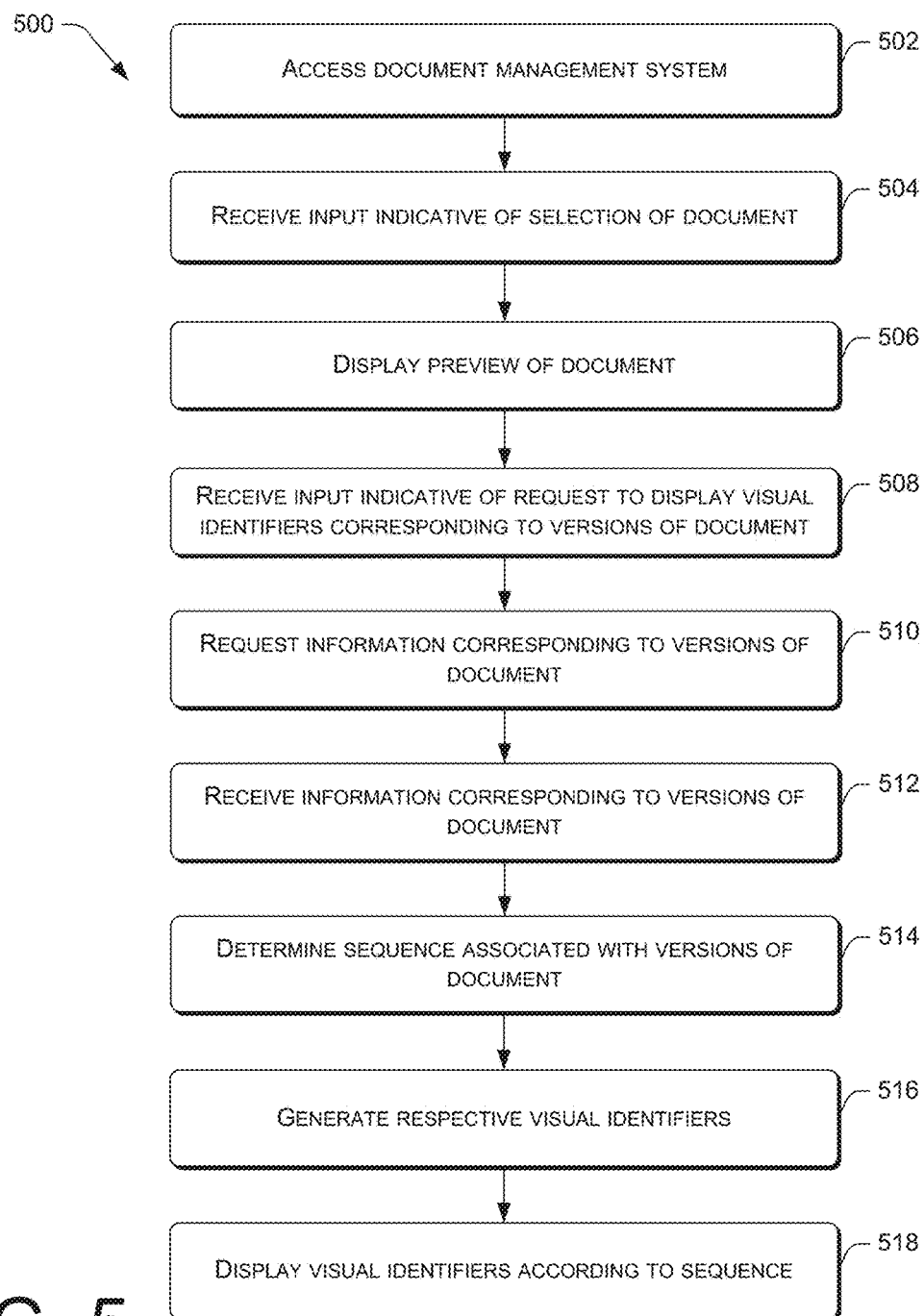
FIG. 5 illustrates a flow diagram of an example method for presenting document version identifiers.

FIG. 5 illustrates a method of displaying visual identifiers associated with different respective versions of a document stored in a memory of a document management and collaboration system 122. FIG. 5, for example, illustrates a flow diagram of an example method 500 of determining a time-based or activity-based sequence associated with the respective versions, generating a respective visual identifier representative of each version of the document, and displaying the visual identifiers on a display device 164 of a computing device 130 according to the determined sequence. The example method 500 is illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types. The order in which the operations are described should not be construed as a limitation. Any number of the described blocks can be combined in any order and/or in parallel to implement the process, or alternative processes, and not all of the blocks need be executed. For discussion purposes, the methods herein are described with reference to the frameworks, architectures and environments described in the examples herein, although the methods may be implemented in a wide variety of other frameworks, architectures or environments.

The description of the various methods may include certain transitional language and directional language, such as "then," "next," "thereafter," "subsequently," "returning to," "continuing to," "proceeding to," etc. These words, and other similar words, are simply intended to guide the reader through the graphical illustrations of the methods and are not intended to limit the order in which the method steps depicted in the illustrations may be performed.

Additionally, one or more of the various method steps depicted in FIG. 5 may be performed by the one or more of the distributed computing resources 104, 106, 108 (FIG. 1) or the client computing devices 130, 132, 134 (FIG. 1) in order to facilitate displaying visual identifiers associated with various versions of documents stored therein and/or in memory associated with such devices. Such methods may take place in a sharing or collaboration session between two or more of the client computing devices 130, 132, 134 described herein and/or may take place while one or more of the computing devices 130, 132, 134 is executing a web-based, local, or server-based document version visualization application. In particular, one or more of the various method steps depicted in FIG. 5 may be performed by the remote shared folder and file synchronization module 120 (FIG. 1) within the distributed computing resources 104, 106, 108 (FIG. 1), the local shared folder and file synchronization module 150 (FIG. 1) within the client computing device 130, 132, 134 (FIG. 1), the document version module 154 and/or within the client computing device 130, 132, 134, or a combination thereof.

As stated above, FIG. 5 illustrates a flow diagram of an example method 500 of displaying visual identifiers corresponding to respective versions of an electronic document. Beginning at 502, the method 500 includes accessing a document management system. In example embodiments, such a document management system may include, among other things, the document management and collaboration system 122 described above with respect to FIG. 1. In example embodiments, a client computing device 130 may access the document management and collaboration system 122 via, for example, the network 102 and using one or more portals, web applications, links, and/or other means of connecting and/or communicating with the document management and collaboration system 122. As described above, for example, such web applications or other means of communicating with the document management and collaboration system 122 may facilitate the transfer of metadata and/or other information associated with various versions of electronic documents stored by the document management and collaboration system 122. For example, the document management and collaboration system 122 may include a plurality of electronic documents organized and/or stored in one or more directories.

At 504, the document version module 154 may receive a first input from a user of the client computing device 130. For example, the document version module 154 may receive a touch input via a touch-sensitive display device 164 of the client computing device 130. In example embodiments, the input received at 504 may be indicative of a selection of at least one document of the plurality of documents stored by the document management and collaboration system 122. In example embodiments in which one or more documents is listed in association with the directory of the document management and collaboration system 122, the input received at 504 may comprise a selection of one of the documents listed in the displayed directory.

At 506, the document version module 154 of the client computing device 130 may cause one or more portions of such a directory, including at least a preview of one or more electronic documents, to be displayed by the display device 164. For example, the document version module 154 may cause a preview of the selected document to be displayed on the display device 164 of the client computing device 130 in response to the input received at 504. In example embodiments, such a displayed preview may comprise, for example, an image of at least a portion of the selected document. In some examples, the displayed portion of the selected document may assist the user in identifying the electronic document and distinguishing the document from others stored in the document management and collaboration system 122.

At 508, the document version module 154 may receive an additional input from the user of the client computing device 130. In some embodiments, the input received at 508 may be indicative of a request by the user to display one or more visual identifiers corresponding to different versions of the selected document. For example, a plurality of different versions of the document corresponding to the selection at 504 may be stored in the document management and collaboration system 122. However it may be difficult for the user to distinguish between the various different versions without obtaining further information (e.g., the time and date of the most recent edit to each respective version, the author of such edits, etc.).

At 510, the document version module 154 may request information corresponding to the different versions of the selected document stored in the document management and collaboration system 122. For example, at 510 the document version module 154 may direct a signal to the document management and collaboration system 122, via the network 102 including a request 310 for such information. In example embodiments, the document management and collaboration system 122 may, in response to receiving such a signal, generate and direct a packet 314 of information to the client computing device 130.

At 512, the document version module 154 may receive information from the document management and collaboration system 122 contained in the packet 314. For example, the information received by the document version module 154 at 512 may correspond to each respective version of the different versions of the electronic document stored in the document management and collaboration system 122. As described above, such information may include, among other things, at least one of a shared history, an edit history, a review history, or a download history of a version of the document. Such information may also include, for example, at least one of the time at which an edit was made to the version, the date at which the edit was made to the version, an author of the edit, an identification of characters added to the version, an identification of characters deleted from the version, the status of the version, a title of the document, or an author of the document.

Further, as noted above the document version module 154 may utilize the information received at 512 in a variety of different ways. For example, at 514 the document version module 154 may determine a sequence associated with the different versions of the document, and such a determination may be based on the information received from the document management and collaboration system 122. In some embodiments, the sequence determined at 514 may comprise a chronological sequence associated with the different versions of the document, and the sequence may result in various visual identifiers being arranged based on the edit dates of their corresponding document versions.

At 516, the document version module 154 may generate a respective visual identifier 320 representative of each version of the document. Additionally, at 518 the document version module 154 may cause the display device 164 to display each of the visual identifiers generated at 516 in accordance with the sequence determined at 514.

In some embodiments, the method 500 may also include the document version module 154 receiving one or more additional inputs from the user of the client computing device 130. For example, in some embodiments the document version module 154 may receive an additional input from the user indicative of a selection of a display layout. In such examples, the document version module 154 may cause two or more display layout options to be displayed by the display device 164. Additionally, or alternatively, a user interface provided by the document version module 154 may include one or more layout controls 408 configured to accept an input from the user indicative of such a selection. In such examples, the display layout may include one of a substantially two-dimensional layout in which the visual identifiers are arranged along the x-axis or the y-axis, or a substantially three-dimensional layout in which the visual identifiers are arranged such that a first identifier overlays at least a portion of a second identifier and has a greater opacity than the second identifier.

Additionally, in some example embodiments the respective visual identifiers may be generated based at least partially on such a selection. For example, in some embodiments at least one of the visual identifiers may comprise an icon including at least a portion of the information received from the document management and collaboration system 122 corresponding to a respective version of the document. Additionally, in other embodiments at least one of the visual identifiers may comprise a thumbnail including an image of at least a portion of a corresponding version of the document.

As noted above, electronic documents are often stored in large databases, document management systems, or other like repositories at remote locations. Such repositories may offer a convenient solution for secure storage of the document. Such repositories may also have ample capacity to store multiple versions of various documents created during various sharing sessions, collaboration sessions, or other processes in which multiple users review, edit, comment on, or otherwise modify the document. While such repositories may be optimized for document storage, such repositories provide little assistance to users seeking to understand the various edits, comments, and the like included in each saved version of the document.

Accordingly, example embodiments of the present disclosure enable users to quickly visualize the various edits, comments, and other changes included in each saved version of a selected electronic document. Embodiments of the present disclosure may present information regarding such changes in a number of ways. In one example, information related to the changes made in each version of a document may be presented by way of a plurality of icons arranged along a linear axis in a chronological order on a display of the computing device. Such icons may be operable to provide further information if desired. In another example, such information may be depicted in by way of a plurality of thumbnails including images of a portion of a respective version of the document. Such thumbnails may be, for example, presented along a orthogonal axis in a chronological order and may become more opaque the closer the thumbnail gets to a first position in the taxonomy.

As a result of the embodiments described herein, the load on processing units employed by the various computing devices may be reduced since such computing devices need not download and/or locally store each version of the document in order to display the icons or thumbnails described above. Additionally, methods of the present disclosure offer unique and heretofore unworkable approaches to visualizing revision information associated with multiple versions of remotely stored documents. Such methods improve user efficiency and improve the overall user experience.

CONCLUSION

Although the techniques have been described in language specific to structural features and/or methodological acts, it is to be understood that the appended claims are not necessarily limited to the features or acts described. Rather, the features and acts are described as example implementations of such techniques.

The operations of the example processes are illustrated in individual blocks and summarized with reference to those blocks. The processes are illustrated as logical flows of blocks, each block of which may represent one or more operations that may be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations may be executed in any order, combined in any order, subdivided into multiple sub-operations, and/or executed in parallel to implement the described processes. The described processes, or portions thereof, may be performed by resources associated with one or more device(s) 104, 106, 108, 130, 132, 134 such as one or more internal or external CPUs or GPUs, and/or one or more pieces of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

The invention claimed is:

1. A method, comprising:
   accessing a document management system, via a network, using a computing device, the document management system including a plurality of documents organized in a directory;
   receiving a first input via the computing device indicating a first selection of a document of the plurality of documents;
   displaying a preview of the document on a display of the computing device in response to the first input;
   receiving a second input indicating a request to display visual identifiers for a first version of the document and a second version of the document stored in the document management system;
   requesting, from the document management system and via the network, information for the first version of the document and the second version of the document;
   receiving the information from the document management system, via the network;
   determining a sequence for collaborative changes made to the first version of the document and the second version of the document based on the information received from the document management system;
   generating a first visual identifier for the first version of the document and a second visual identifier for the second version of the document using the information, wherein:
      the first visual identifier comprises a first image of at least a portion of the first version of the document and the second visual identifier comprises a second image of at least a portion of the second version of the document; and
      the first image illustrating first indicia of first revisions made to the first version of the document, and the second image illustrating second indicia of second revisions made to the second version of the document;
   displaying one or more controls on the display, a first control of the one or more controls being operable to receive a third input associated with a plurality of display layouts, wherein:
      a first display layout of the plurality of display layouts specifies a first arrangement according to which the first visual identifier and the second visual identifier are to be presented on the display based at least in part on the sequence; and
      a second display layout of the plurality of display layouts specifies a second arrangement according to which the first visual identifier and the second visual identifier are to be presented on the display based at least in part on the sequence;
   receiving a third input via the first control, the third input indicating a second selection of the second display layout; and
   displaying the first visual identifier and the second visual identifier on the display, according to the sequence and the second display layout, such that the first indicia of the first revisions made to the first version are displayed at least partly at a same time as the second indicia of the second revisions made to the second version.

2. The method of claim 1,
   wherein the first visual identifier and the second visual identifier are displayed, in a three-dimensional arrangement, at least partly in response to the third input such that:
      the first identifier overlays at least a portion of the second identifier; and
      the first identifier has a greater opacity than the second identifier.

3. The method of claim 1, wherein the first visual identifier includes a second control of the one or more controls displayed thereon, the second control being operable to receive a further input and associated with a particular version of the document corresponding to the first identifier.

4. The method of claim 3, wherein the second control comprises at least one of a roll-back control or an audit control, the roll-back control being operable to delete a version of the document stored in the document management system corresponding to the at least one of the first visual identifier or the second visual identifier, the audit control being operable to display, via the display, at least one of a share history of the version of the document, an edit history of the version of the document, a view history of the version of the document, or a download history of the version of the document corresponding to the at least one of the first visual identifier or the second visual identifier.

5. The method of claim 1, wherein the information received from the document management system comprises a share history of a version of the document, an edit history of the version of the document, a view history of the version of the document, a download history of the version of the document, a time at which an edit was made to the version of the document, a date at which the edit was made to the version of the document, an author of the edit, an identification of characters added to the version of the document, an identification of characters deleted from the version of the document, a status of the version of the document, a title of the document, or an author of the document.

6. The method of claim 1, further comprising:
   prior to receiving the third input, displaying the first visual identifier and the second visual identifier on the display, according to the sequence and the first display layout; and
   in response to receiving the third input via the first control indicating the second selection of the second display layout, rearranging the first visual identifier and the second visual identifier from the first arrangement of the first display layout to the second arrangement of the second display layout.

7. A method, comprising:
   receiving a first input via a computing device indicative of a request to display a representation of a first version of a document and a second version of the document, wherein the first version and the second version are stored in a remote document management system;

receiving information from the remote document management system corresponding to the first version of the document and the second version of the document;

generating a first visual identifier for the first version of the document and a second visual identifier for the second version of the document using the information;

receiving a second input via the computing device, the second input indicating a selection of a display layout of a plurality of display layouts, wherein:

each of the plurality of display layouts is associated with the first visual identifier and the second visual identifier; and the display layout specifies a first arrangement according to which the first visual identifier and the second visual identifier are to be presented on the display based at least in part on a sequence for the first version of the document and the second version of the document; and displaying the first visual identifier and the second visual identifier on a display of the computing device, according to the display layout, and according to the sequence, wherein:

the first visual identifier comprises a first image of at least a portion of the first version of the document and the second visual identifier comprises a second image of at least a portion of the second version of the document;

the first image illustrates first indicia of first revisions made to the first version of the document, and the second image illustrates second indicia of second revisions made to the second version of the document; and the first indicia of the first revisions made to the first version are displayed at least partly at a same time as the second indicia of the second revisions made to the second version.

8. The method of claim 7, further comprising:

displaying one or more controls on the display, a first control of the one or more controls being operable to receive the second input;

receiving the second input via the first control; and displaying the first visual identifier and the second visual identifier, in a three-dimensional arrangement, at least partly in response to the second input, such that:

the first identifier overlays at least a portion of the second identifier; and the first identifier has a greater opacity than the second identifier.

9. The method of claim 7, further comprising generating the first visual identifier and the second visual identifier based on the selection.

10. The method of claim 7, wherein the first visual identifier and the second visual identifier comprise at least a portion of the information received from the remote document management system.

11. The method of claim 10, further comprising receiving an additional input via the first identifier, and providing an additional portion of the information received from the at least one document management system in response to the additional input, wherein the additional portion of the information corresponds to a version of the document associated with the first identifier.

12. The method of claim 7, wherein the first visual identifier and the second visual identifier comprise a plurality of thumbnails arranged on the display such that a first thumbnail of the plurality of thumbnails overlays at least a portion of a second thumbnail of the plurality of thumbnails different from the first thumbnail.

13. The method of claim 12, further comprising receiving an additional input via the first thumbnail and displaying a respective version of the document corresponding to the first thumbnail on the display in response to the additional input.

14. The method of claim 12, wherein the first thumbnail has a first opacity and the second thumbnail has a second opacity different from the first opacity.

15. The method of claim 7, wherein at least one of the first visual identifier or the second visual identifier includes a roll-back control operable to delete the version of the document stored in the remote document management system corresponding to the at least one of the first visual identifier or the second visual identifier.

16. The method of claim 7, wherein at least one of the first visual identifier or the second visual identifier includes an audit control operable to display, via the display, at least one of a share history, an edit history, a view history, or a download history of the version of the document corresponding to the at least one of the first visual identifier or the second visual identifier.

17. The method of claim 7, further comprising determining the sequence based on the information.

18. A computing device, comprising:

one or more computer-readable media including one or more computer-executable instructions; and a processing unit operably coupled to the computer-readable media, the processing unit adapted to execute the one or more computer-executable instructions, wherein executing the one or more computer-executable instructions causes the processing unit to:

receive a first input indicative of a request to display a representation of a first version of a document and a second version of the document, wherein the first version of the document and the second version of the document are stored in a remote document management system;

receive information from the remote document management system corresponding to the first version of the document and the second version of the document;

generate a first visual identifier for the first version of the document and a second visual identifier for the second version of the document using the information;

receive a second input, the second input indicating a selection of a display layout of a plurality of display layouts, wherein:

each of the plurality of display layouts is associated with the first visual identifier and the second visual identifier; and the display layout specifies a first arrangement according to which the first visual identifier and the second visual identifier are to be presented on the display based at least in part on a sequence for the first version of the document and the second version of the document; and cause the first visual identifier and the second visual identifier to be displayed on a display of the computing device, according to the display layout, and according to the sequence, wherein:

the first visual identifier comprises a first image of at least a portion of the first version of the document and the second visual identifier comprises a second image of at least a portion of the second version of the document;

the first image illustrates first indicia of first revisions made to the first version of the document, and the second image illustrates second indicia of second revisions made to the second version of the document; and the first indicia of the first revisions made to the first version are displayed at least partly at a same time as the second indicia of the second revisions made to the second version.

19. The computing device of claim 18, the first revisions made to the first version of the document having been made using a document collaboration system.

20. The computing device of claim 18, wherein the first visual identifier and the second visual identifier comprise a plurality of thumbnails arranged on the display according to the display layout such that a first thumbnail of the plurality of thumbnails overlays at least a portion of a second thumbnail of the plurality of thumbnails different from the first thumbnail, wherein:

the first thumbnail has a first opacity and the second thumbnail has a second opacity different from the first opacity; and the computing device is configured to display a version of the document corresponding to the first thumbnail on the display in response to receiving an additional input via the first thumbnail.

\* \* \* \* \*